(12) United States Patent
Barnes et al.

(10) Patent No.: US 6,270,817 B1
(45) Date of Patent: Aug. 7, 2001

(54) CRUMB COATING COMPOSITION

(75) Inventors: Douglas James Barnes, Cambs; Brian Charles Fletcher, Bedford; Mervyn Roy Goddard, Northamptonshire; Jamie Carl Martin, Northants; Malcolm John McBride, Northamptonshire; William John Stewart, Northants, all of (GB)

(73) Assignee: Thomas J. Lipton Co., division of Conopco, Inc., Englewood Cliffs, NJ (US)

(*) Notice: Subject to any disclaimer, the term of this patent is extended or adjusted under 35 U.S.C. 154(b) by 0 days.

(21) Appl. No.: 08/936,879

(22) Filed: Sep. 25, 1997

Related U.S. Application Data

(63) Continuation of application No. 08/519,470, filed on Aug. 25, 1995, now abandoned, which is a continuation-in-part of application No. 08/201,298, filed on Feb. 24, 1994, now abandoned.

(30) Foreign Application Priority Data

Feb. 26, 1993 (EP) ................................................ 93301495

(51) Int. Cl.⁷ ................................ A23L 1/10; A23J 1/12; A23J 3/00
(52) U.S. Cl. ........................... 426/92; 426/293; 426/296; 426/289; 426/652; 426/96
(58) Field of Search ...................................... 426/296, 289, 426/555, 96, 102, 92, 618, 652, 293, 299, 656

(56) References Cited

U.S. PATENT DOCUMENTS

| 4,208,442 | * | 6/1980 | Evans et al. ........................... 426/296 |
| 4,260,637 | | 4/1981 | Rispoli et al. . |
| 4,897,275 | | 1/1990 | Nagai et al. . |
| 5,171,605 | * | 12/1992 | Attenburrow et al. ............... 426/656 |

FOREIGN PATENT DOCUMENTS

| 650 129 | 7/1985 | (CH) . |
| 1 517 013 | 4/1969 | (DE) . |
| 0 094 112 | 11/1983 | (EP) . |
| 1454230 | 8/1966 | (FR) . |
| 2 028 341 | 3/1980 | (GB) . |

* cited by examiner

Primary Examiner—Anthony J. Weier
(74) Attorney, Agent, or Firm—James J. Farrell

(57) ABSTRACT

A crumb coating composition formed by agglomeration which includes (a) an insoluble powdered first protein at least 80% of which has a particle size of greater than 0.5 mm; and (b) a soluble second protein or a polysaccharide capable of being heat set during crumb manufacture, the final agglomerated crumb coating having an average particle size of about 4 to 15 times the size of the first protein; which is used for coating food products and has beneficial crispness qualities, particularly where the food product is prepared for consumption via microwave heating.

12 Claims, 4 Drawing Sheets

CRUMB COATING COMPOSITION

This is a continuation application of Ser. No. 08/519,470, filed on Aug. 25, 1995, now abandoned, which is a continuation in part of Ser. No. 08/201,298 filed on Feb. 24, 1994, now abandoned.

FIELD OF THE INVENTION

The invention relates to a novel food crumb coating composition which is resistant to relatively high water activities without substantial degradation of quality.

BACKGROUND OF THE INVENTION

There is a continuing need for coated food products such as coated meat, poultry, vegetables or fish. Usually, these coated food products are obtained by first wetting a raw or at least partially cooked, optionally frozen, product, for instance by glazing or dipping into, or enrobing with, a fluid substance such as water or batter and, subsequent to wetting, applying a particulate breading material. If desired, the steps of wetting and breading can be repeated to obtain a multilayered coating. Before storage the coating may be pre-set, for instance by pre-frying.

Well known crumb coating materials contain particles of a heat-treated starchy material. Several methods for obtaining these materials are also well known. One of these methods involves the baking of a loaf of bread which, after staling, is ground into conventional bread crumbs. Another method involves the cooker extrusion of a mixture of flour and water, for instance to obtain so-called Japanese crumbs.

Crumb coated products are often stored at frozen conditions. For consumption the products are heated, for instance by deep or shallow fat frying, oven baking, roasting, microwave heating or grilling. One of the factors which negatively affects the quality of crumb coatings is the absorption of moisture by the coating, which can result in soggy, disintegrated, unattractive coating layers. Relatively high environmental moisture levels often result within a short time in absorption of moisture by the crumb coating. Relatively high environmental moisture contents can occur during microwave-heating of coated products. During microwave-heating food products are thoroughly heated, thus resulting in moisture migration from the center of the product to the crust portion. The air surrounding the product is, however, not substantially heated by the microwaves. The low temperature of the surrounding air prevents effective moisture removal from the crust, thus giving high moisture coating layers of inferior quality.

There is need of crumb coating materials which are resistant to high water activities without substantial degradation of quality. Specifically, there is need a for crumb coating materials which allow the microwave heating of the coated food products while maintaining the quality of the coating layer, particularly after extended periods of frozen storage.

U.S. Pat. No. 4,260,637 to Rispoli deals with bread crumb compositions which are said to adhere to moistened comestibles during coating and cooking without the need to batter coat the comestible. In essence, relatively large bread crumbs are coated with an adhesive and then adhered to a comestible. The Rispoli patent seeks to coat a previously formed crumb structure with a thin layer of adhesive particles by pan coating. The coated particles are adhered to a food comestible by moistening the surface of the comestible. There is little, if any, agglomeration of the crumb composition.

The instant invention seeks to build a crumb-like structure from a large number of small particles by agglomeration which are suitable for conventional adhesion to a food comestible with a batter system.

It will be found that when there is a preponderance of large particles with a low phase volume of fine particles which become sticky on wetting, then the fine particles coat the surface of the large particles, (i.e., Rispoli crumb). Conversely, when there is a preponderance of small particles then these become adhered to each other and grow to form agglomerates (i.e., crumb of the invention).

It has been found that novel coatings manufactured using agglomeration techniques are significantly improved with respect to their quality, particularly after microwave heating.

SUMMARY OF THE INVENTION

Accordingly, the invention provides a food crumb coating formed via agglomeration comprising:

(a) an insoluble powdered first protein, preferably at least 80% of which has a particle size of greater than 0.5 mm; and (b) a soluble second protein or a polysaccharide capable of being heat set during crumb formation.

BRIEF DESCRIPTION OF THE DRAWINGS

The photographs show crumbs made by the inventive technique as compared to crumbs made by Example 3 of U.S. Pat. No. 4,260,637.

DESCRIPTION OF THE PREFERRED EMBODIMENT

Figure 1:
FIG. 1 shows the first protein starting material.

Agglomerated crumb coatings are particulates which, in appearance and functional behavior, are similar to breadcrumb materials as described above but are prepared from much smaller initial particles.

It is essential that the first powdered proteins of the invention are insoluble in water. These can be any such proteins which are of food grade.

Preferably the powdered protein is selected from vegetable proteins, such as cereal proteins, denatured proteins and mixtures thereof; preferably the powdered protein is a cereal protein, particularly wheat proteins, for example gluten, hordein, zein, kafirin, and avenins; more preferably the powdered protein is gluten.

It is important that the powdered protein used has a particle size such that at least 80% is greater than 0.5 mm, since particles having a diameter of less than 0.5 mm hydrate too quickly to enable processing. It is preferred that the powdered protein has a particle size of from 0.5–1 mm, and most preferred that the powdered protein has a particle size of from 0.5–0.7 mm.

Soluble second proteins or polysaccharides are proteins or polysaccharides capable of being solubilized in water, salt solutions and alcohol/water mixes. These can be any such proteins or polysaccharides which are of food grade and are additionally capable of being heat set.

Preferably the soluble protein is selected from albumins, globulins, gliadins, glutenins, gelatin, muscle protein and mixtures thereof. More preferably the soluble protein is selected from albumins, globulins and mixtures thereof.

Examples of suitable soluble proteins are sodium caseinate and egg albumin.

Examples of suitable soluble polysaccharides are pectin, Guar gum, Locust Bean Gum and mixtures thereof.

In order to be used in the agglomeration process described below, the soluble protein or polysaccharide is solubilized in water, salt solution or a water/alcohol solution. Preferably the solubilized protein or polysaccharide is sprayed to form atomized droplets having a droplet size of from 0 to 100 μm, preferably 10 to 30 μm, most preferably 20 μm.

The agglomerated crumb coating according to the invention preferably comprises powdered protein and soluble protein or polysaccharide at a w/w ratio of from 60:40 to 90:10 and has a diameter of 4 to 15 times the size of the original insoluble particles.

The agglomerated crumbs will usually totally replace the bread crumb material which would normally be needed in the breading composition. If desired it is, however, possible to use a breading system in which both conventional bread crumbs and agglomerated crumbs are present. For safeguarding quality it is, however, preferred that the weight ratio of agglomerated crumbs to conventional bread crumbs is more than 1 to 1.

Additionally the crumb coating composition may comprise starch granules. It is preferred that these starch granules have a high amylopectin content, for example waxy maize starch.

Further optional ingredients in the crumb coating composition which may be included are, for example, flavoring materials, fillers, vegetable particles, sugar, fats and gasifying agents.

The final crumb prepared by agglomeration will preferably have the following composition:

60–90% powdered protein

10–40% soluble protein

0–20% starch and will have a final particle size of about 4 to 15 times the particle size of the original starting particle, i.e., the first protein.

MANUFACTURE OF THE CRUMB COATING

The Agglomeration Process

Agglomeration is a well known technique whereby ingredients are brought into contact by some form of agitation, in such a way that a stable granule is formed. There are a number of different agglomeration processes but they all have common general features. First there is a wetting/agglomeration section which is followed by an equilibrium section and finally a drying section. Wetting the dry mix may be by steam condensation, by solvent droplets (usually water plus binder) from a fine spray and in some cases by a combination of the two. Droplet sizes must be equal to or less than the dried powder particle size. If the dry mix is wetted by a spray rather than steam, some of the soluble ingredients may be dissolved in the liquid to act as binder i.e., the binding material enhances bonding between the particulate matter. Alternatively, the binder can be included in the formulation as part of the dry mix.

Agitation of the dry powders is either mechanical or gaseous. The main types of agglomerating devices are rolling drums, pan granulators, all types of mixers, fluid beds and steam rewet systems. Some of these units are self-contained with the wetting/agglomeration and drying all taking place in the same unit. Alternatively, some types of equipment will wet/agglomerate in one unit and dry the granules in a separate dryer. Granules may also be formed by applying pressure to the dry powder e.g., compaction.

USE OF THE CRUMB COATING COMPOSITION

Crumb coating compositions according to the invention may be used to provide food products such as coated meat, poultry, vegetables or fish.

The crumb coating is preferably applied to a food substance which has first been wetted by deglazing or dipping into, or spraying with, a fluid substance such as water or batter. The coating may be pre-set, for instance by pre-frying.

Food products coated with the crumb coating according to the invention on heating for consumption have a desirable crisp crumb coating, superior to previously known crumbs. This is particularly true when the product is prepared for consumption via microwave heating.

Having generally described various aspects of the present invention, the invention will now be more particularly described with reference to the following specific examples.

EXAMPLES 1–4 COMPARATIVE EXAMPLE A

Crumbs having the formulations shown in Table 1 were prepared by agglomeration using an aeromatic machine (type MPI Bubendorf, Switzerland). A 10% w/v solution of soluble protein (casein or albumin) in water was added to the powdered protein (gluten) plus any additional ingredient(s) at 17–25 ml/min.

Crumb samples were sieved to a size fraction of between 2.4 to 2.8 mm.

TABLE 1

| | COMPOSITION % (W/W) | | | |
| --- | --- | --- | --- | --- |
| | | SOLUBLE PROTEIN | | |
| EXAMPLE | INSOLUBLE | CASEIN | ALBUMIN | STARCH |
| 1 | 90 | 10 | — | — |
| 2 | 80 | 10 | — | 10 |
| 3 | 90 | — | 10 | — |
| 4 | 80 | — | 10 | 10 |

*99.8% of the gluten had a particle size greater than 0.5 mm was obtained from ABR Foods Ltd. of Corby Northants, England.

These products were then tested for moisture resistance by equilibrating in environments of different relative humidity. After equilibration the brittleness properties of the product were determined by measuring the acoustic emission using a Locan® analyzer when fracturing the product and expressing this as a percentage of the acoustic emission when fracturing the freshly prepared product.

The acoustic emission (AE) technique is a method for examining the behavior of materials deforming under stress. Acoustic Emission may be defined as a transient elastic wave generated by the rapid release of energy within a material. There is a significant correlation (P<0.01) between sensory crispness and Acoustic Emission (τ=0.701). Crisp materials release energy as they rapidly break down (fracture) on compression.

The Acoustic Emission testing of cereal based crumbs has been undertaken using an Instron Universal Testing Machine and Locan-AT Acoustic Emission Recorder.

(i) Crumb samples are sieved to size fraction 2.4→2.8 mm.

(ii) 3 crumbs are placed on a 150 mm diameter compression anvil (stationary).

(iii) A 50 mm diameter compression anvil is used to compress the crumbs to an anvil-anvil separation of 0.3 mm.

(iv) Cross-head speed is 50 mm/min.

(v) Locan-AT recorder receives AE emitted from sample during compression via Sensor attached (by tape) to 150 mm compression table.

(vi) Effective acoustic pathway between sensor and anvil achieved by use of Duckhams Keenol Grease.

(vii) The number of Acoustic Emission "hits" during the compression is recorded.

(viii) A loose paper collar is fixed around the crushing anvil to prevent scattering of fractured crumb sample.

This routine is repeated six times for each crumb type and the mean and standard deviation reported.

Retesting of a crumb type after hydration to a higher water level may then produce a lower number of AE hits—the crumb has retained some of its initial crispness. The retention of crispness on hydration can be expressed as a % retention of initial AE hits (e.g., 200 AE hits initial, 50 after hydration→25% AE hits retention).

A taste panel run in parallel with the initial AE testing will help interpretation of % retention AE hits by providing an indication of the "degree" of initial crispness and mouthfeel.

The results obtained with crumbs according to the invention were compared with results obtained with a conventional Pandora F1004 Japanese breadcrumb (Comparative Example A) obtained from RHM Ingredient Supplies of Corby, Northants England.

The results of these experiments are shown in Table 2, the higher number of AE hits showing crisper crumbs.

TABLE 2

| EXAMPLE | 0% RH AE HITS | 72% RH AE HITS | % RETENTION |
|---|---|---|---|
| 1 | 88 | 31 | 35 |
| 2 | 86 | 28 | 33 |
| 3 | 173 | 94 | 54 |
| 4 | 84 | 36 | 43 |
| A | 158 | 45 | 28 |

It can clearly be seen that agglomerated crumb is significantly better than control sample. Inclusion of starch at 10% in the agglomerated crumb improved the mouthfeel of the crumb, and still had hydration properties significantly better than the control.

COMPARATIVE EXAMPLES B–E

Using the formulations for Examples 1–4 given above, except that 100% of gluten had a particle size less than 0.5 mm, it was discovered that no agglomerated crumbs could be made when using the same agglomeration process as detailed above.

COMPARATIVE EXAMPLES F AND G

Figure 2:
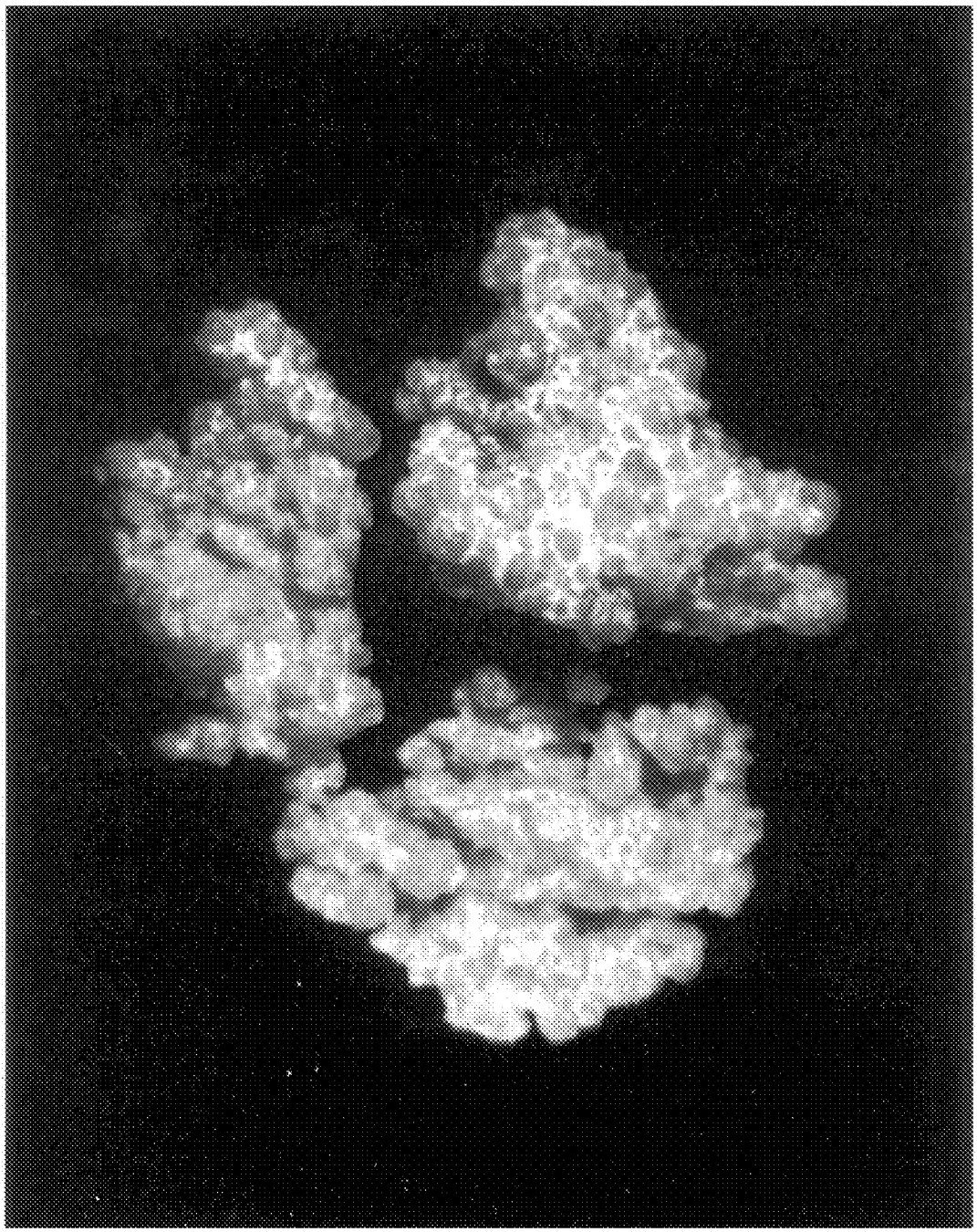
FIG. 2 shows the final agglomerated crumb.

Comparison of U.S. Pat. No. 4,260,637 (Rispoli) and the invention. In Example F, the inventive process was reproduced using the raw material of FIG. 1 and yielded the product shown in FIG. 2. In each case the magnification was ×6. As can be seen there is a significant increase in particle size with the fine adhesive material holding the particles together. In these photos the size increase which is evident is an 8 fold increase in diameter (64 times increase in volume). In general a 4–15 times increase in diameter is achieved.

Figure 3:
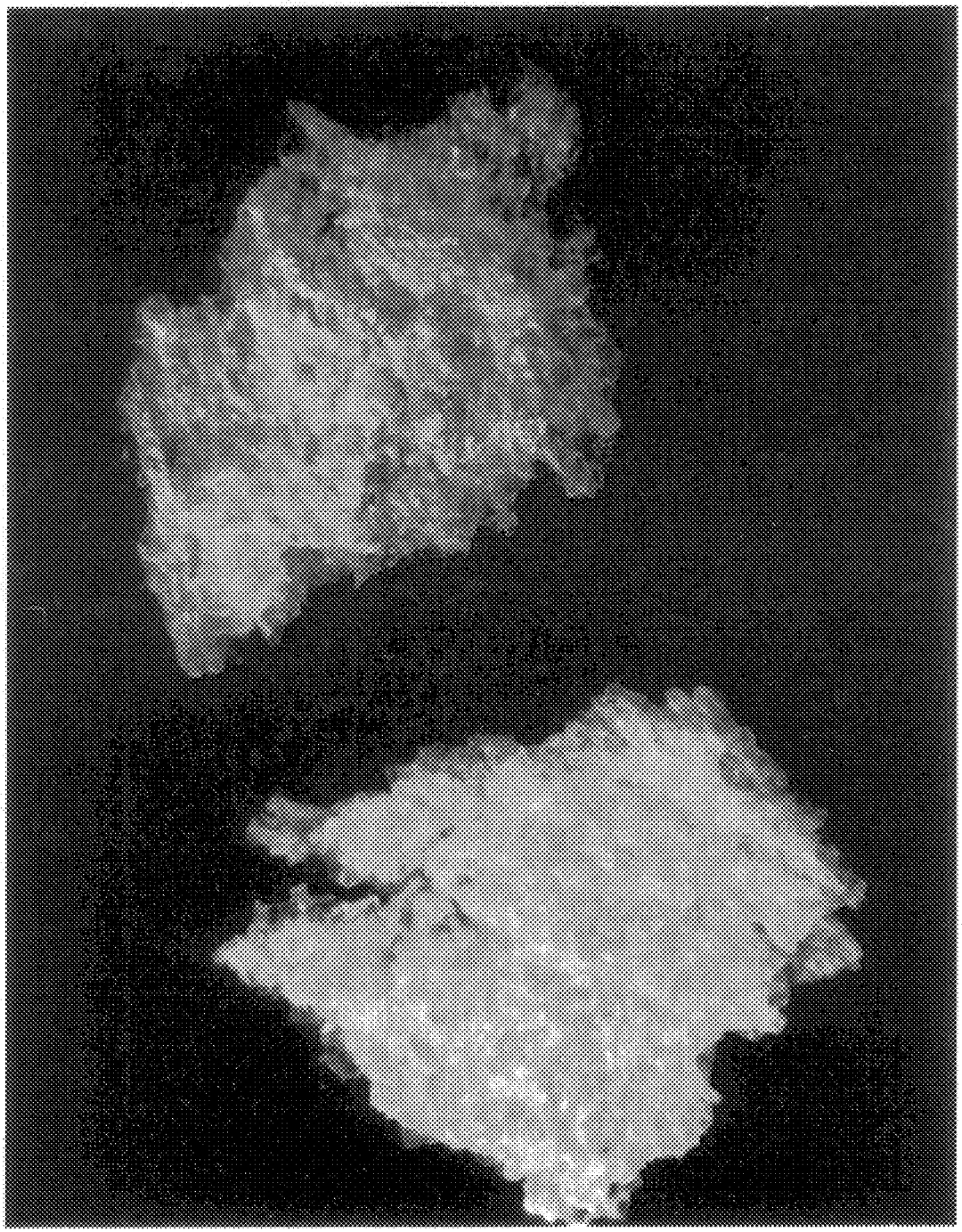
FIG. 3 shows the initial crumb of Example 3 of U.S. Pat. No. 4,260,637.
Figure 4:
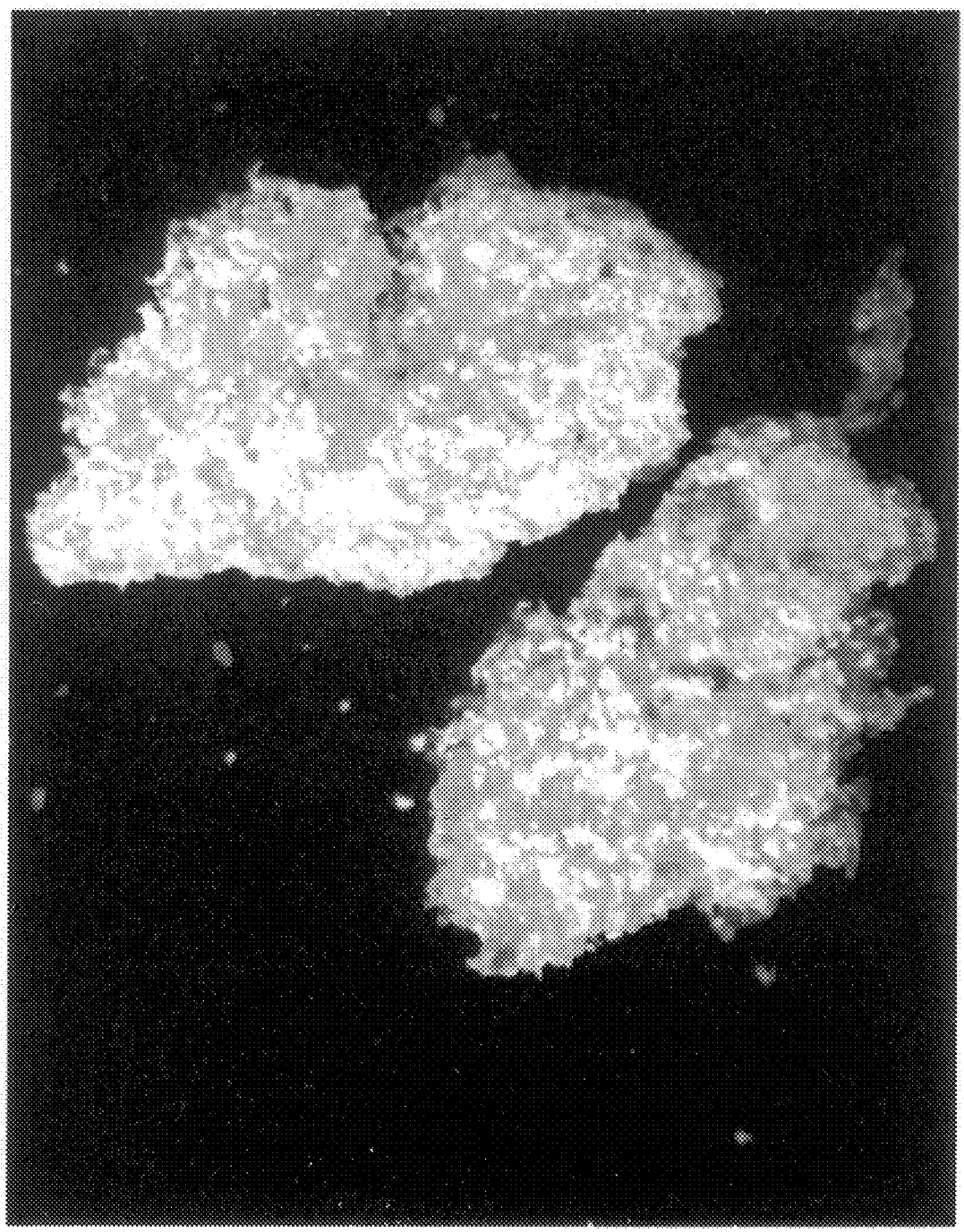
FIG. 4 shows the final crumb after treating according to Example 3.

In Example 5 the Rispoli process (Example III) was reproduced using the raw material of FIG. 3 (an already formed crumb), i.e., 78.2% of F1052 Japanese Crumb ex RHM, 10.43% of albumin and 10.43% of seasoning mix (salt and pepper) but no paprika. The coating was adhered to the crumb by addition of a 5% solution of gum arabic in a rotating coating pan and yielded the product shown in FIG. 4. Again, the magnification in each case was ×6. In these photos there is obviously little change in the size of the particles but they have been coated in a thin layer of adhesive particles.

There are clearly differences in the materials. Agglomerated structures are not made by the process of Example G, nor do agglomerated particles of Example F necessarily deliver "self adhesive" characteristics. Furthermore, the crumbs of Example G do not deliver the reduced moisture uptake and hence microwaveability characteristics of the Unilever "crumb like" agglomerates, as is evident from a comparison of the photos which show that the Example G crumb is much more porous than the crumb of Example F.

It should be understood that the specific forms of the invention herein illustrated and described are intended to be representative only. Changes, including but not limited to those suggested in this specification, may be made in the illustrated embodiments without departing from the clear teachings of the disclosure. Accordingly, reference should be made to the following appended claims in determining the full scope of the invention.

What is claimed is:

1. A process for preparing a food crumbs coating comprising the steps of:
    a) taking a first protein in powdered form, said first protein being insoluble in water and having a particle size such that at least 80% by weight of the first protein has a particle size of greater that 0.5 mm;
    b) taking a second protein or polysaccharide capable of being heat set during crumb formation;
    c) solubilising the second protein or polysaccharide in a solvent selected from the group consisting of water, salt solutions and alcohol water mixes;
    d) agglomerating the first protein by contacting said first protein with said solubilised second protein or polysaccharide to form crumbs comprising the first protein in powdered form.

2. The process according to claim 1 wherein agglomerating the first protein forms crumbs having a diameter of 4 to 15 times the diameter of the particles of first protein.

3. The process according to claim 1 wherein the first protein is selected from the group consisting of vegetable protein, denatured protein and mixtures thereof.

4. The process according to claim 1 wherein the first protein is gluten.

5. The process according to claim 1 wherein the first protein has a particle size within the range 0.5 to 1 mm.

6. The process according to claim 1 wherein the second protein is selected from the group consisting of albumins, globulins, gliadins, glutenins, gelatin, muscle protein and mixtures thereof.

7. The process according to claim 6 wherein the second protein is selected from the group consisting of albumins, globulins and mixtures thereof.

8. The process according to claim 1 wherein the soluble polysaccharide is selected from the group consisting of pectin, Guar Gum, Locust Bean Gum and mixtures thereof.

9. The process according to claim 1 wherein the ratio of the first protein to the second protein or polysaccharide is from 60:40 to 90:10 weight to weight ratio.

10. The process according to claim 1 which additionally comprises agglomerating starch granules in step c.

11. The process according to claim 10 wherein the starch granules have a high amylopectin content.

12. A food crumb coating prepared by the process claimed in claim 1.

\* \* \* \* \*